(12) United States Patent
Ilvonen et al.

(10) Patent No.: US 11,228,094 B2
(45) Date of Patent: Jan. 18, 2022

(54) ANTENNA ARRANGEMENT WITH WAVE TRAP AND USER EQUIPMENT

(71) Applicant: HUAWEI TECHNOLOGIES CO., LTD., Guangdong (CN)

(72) Inventors: Janne Ilvonen, Helsinki (FI); Ruiyuan Tian, Helsinki (FI); Changnian Xu, Shenzhen (CN); Li Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/979,267

(22) PCT Filed: Apr. 5, 2018

(86) PCT No.: PCT/EP2018/058741
§ 371 (c)(1),
(2) Date: Sep. 9, 2020

(87) PCT Pub. No.: WO2019/192707
PCT Pub. Date: Oct. 10, 2019

(65) Prior Publication Data
US 2020/0403296 A1    Dec. 24, 2020

(51) Int. Cl.
*H01Q 1/24* (2006.01)
*H01Q 5/321* (2015.01)
(Continued)

(52) U.S. Cl.
CPC ............ *H01Q 1/243* (2013.01); *H01Q 1/521* (2013.01); *H01Q 5/321* (2015.01); *H01Q 9/42* (2013.01);
(Continued)

(58) Field of Classification Search
CPC ........ H01Q 1/243; H01Q 5/321; H01Q 1/521; H01Q 9/42; H04B 1/0064; H04B 1/3833
See application file for complete search history.

(56) References Cited

U.S. PATENT DOCUMENTS 2,535,298 A    12/1950 Lattin
6,266,026 B1 *  7/2001 Stengel, Jr. ............. H01Q 5/00
                                              343/791
(Continued)

FOREIGN PATENT DOCUMENTS

CN    102110887 A    6/2011
CN    103368626 A    10/2013
(Continued)

OTHER PUBLICATIONS

Office Action issued in CN201880090213.4, dated Jun. 8, 2021, total 10 pages.
(Continued)

*Primary Examiner* — Nguyen T Vo

(57) ABSTRACT

An antenna arrangement for a user equipment is disclosed. The antenna arrangement comprises a first antenna element configured to operate at frequencies above a limit frequency, a second antenna element configured to operate at frequencies below the limit frequency, and a wave trap configured to resonate within a frequency band above the limit frequency. The wave trap is connected to the second antenna element.

20 Claims, 7 Drawing Sheets

(51) Int. Cl.
    *H01Q 1/52*           (2006.01)
    *H01Q 9/42*           (2006.01)
    *H04B 1/00*           (2006.01)
    *H04B 1/3827*       (2015.01)

(52) U.S. Cl.
    CPC ......... *H04B 1/0064* (2013.01); *H04B 1/3833* (2013.01)

(56) References Cited

U.S. PATENT DOCUMENTS

| | | | |
|---|---|---|---|
| 9,379,433 | B2 | 6/2016 | Ying |
| 10,630,330 | B2 * | 4/2020 | Nishikawa ............. H01Q 5/371 |
| 2002/0080074 | A1 | 6/2002 | Wang |
| 2009/0027286 | A1 | 1/2009 | Ohishi et al. |
| 2009/0213026 | A1 | 8/2009 | Lindberg et al. |
| 2013/0069842 | A1 | 3/2013 | Lee et al. |
| 2014/0159981 | A1 | 6/2014 | Wang |
| 2016/0126632 | A1 | 5/2016 | Ying |
| 2016/0204512 | A1 | 7/2016 | Ying et al. |
| 2017/0040668 | A1 | 2/2017 | Vazquez et al. |
| 2017/0054196 | A1 | 2/2017 | Hu et al. |
| 2018/0034148 | A1 | 2/2018 | Nam et al. |

FOREIGN PATENT DOCUMENTS

| | | |
|---|---|---|
| CN | 103748740 A | 4/2014 |
| CN | 103840273 A | 6/2014 |
| CN | 104218314 A | 12/2014 |
| CN | 104916921 A | 9/2015 |
| CN | 106252829 A | 12/2016 |
| CN | 106887678 A | 6/2017 |
| CN | 107210517 A | 9/2017 |
| EP | 2091103 A1 | 8/2009 |

OTHER PUBLICATIONS

P. Lindberg and E. Öjefors, "A bandwidth enhancement technique for mobile handset antennas using wavetraps", IEEE Trans. Antennas, IEEE Transactions on Antennas and Propagation, vol. 54, No. 8, Aug. 2006, pp. 2226-2233.

J. Holopainen, J. Ilvonen, O. Kivekäs, R. Valkonen, C. Icheln, and P. Vainikainen, "Near-field control of handset antennas based on inverted-top wavetraps: focus on hearing-aid compatibility", IEEE AWPL, vol. 8 ,2009., pp. 592-595.

J. Ilvonen, "Multiband and environment insensitive handset antennas", Ph.D. Dissertation, Aalto University, Dec. 2014, total 101 pages.

Kang, T.-W. and Wong, K.-L. ,"Isolation improvement of 2.4/5.2/5.8 GHz WLAN internal laptop computer antennas using dual-band strip resonator as a wavetrap," Microwave and Optical Technology Letters / vol. 52, No. 1, Jan. 2010, total 7 pages.

International Search Report and Written Opinion dated Nov. 30, 2018, issued in PCT/EP2018/058741, total 15 pages.

Office Action issued in EP18717005.5, dated Oct. 29, 2021, 11 pages.

* cited by examiner

ANTENNA ARRANGEMENT WITH WAVE TRAP AND USER EQUIPMENT

CROSS-REFERENCE TO RELATED APPLICATIONS

This application is a national stage of International Application No. PCT/EP2018/058741, filed on Apr. 5, 2018, which is hereby incorporated by reference in its entirety.

TECHNICAL FIELD

The present disclosure relates to an antenna arrangement for a user equipment. The present disclosure further relates to a user equipment.

BACKGROUND

A user equipment, such as a mobile telephone is configured for radio communication. Other kinds of user equipment configured for radio communication may be e.g. a tablet computer, a lap top computer, or a wearable device such as a smart watch. User equipment configured for radio communication comprise one or more antennas for transmitting and/or receiving electromagnetic waves.

User equipment may be configured for radio communication at one, two or more different frequencies. For widely differing frequencies, different antennas are required. For instance, a user equipment may comprise a Low Band frequency antenna element operating below 1 GHz and a Middle-High band frequency antenna element operating within a frequency range of 1-6 GHz. The user equipment may comprise more than two antenna elements. Each antenna element is individually fed by a signal source of the user equipment. Due to physical space restrictions in the user equipment the different antenna elements may have to be arranged close together within a housing of the user equipment. Depending on how the antenna elements are arranged in relation to each other, there may be poor isolation between the different antenna elements. For instance, there may be poor isolation between a Low Band frequency antenna element and a Middle-High band frequency antenna element, or between two Low Band antenna elements. Thus, performance of the Middle-High band frequency antenna element may be limited as some power is dissipated via the Low Band frequency antenna element. This may be a particular problem in user equipment with limited space for arrangement of the two antenna elements, such as e.g. in a mobile telephone.

A so-called wave trap in the form of a resonator may be utilized e.g. to manipulate isolation of an antenna element, manipulate impedance bandwidth of an antenna element, and manipulate radiation pattern of an antenna element. A wave trap may operate according to a principle wherein a high-impedance is created in a space with a short-circuited, quarter-wavelength-long transmission line. A wave trap is conventionally connected to a system ground.

Wave traps implemented by connection to a ground system require additional space in a user equipment. Space may be limited inside a user equipment.

SUMMARY

It would be advantageous to achieve an antenna arrangement comprising a wave trap overcoming, or at least alleviating, the above-mentioned drawback. It would be advantageous to achieve a user equipment comprising an antenna arrangement with a wave trap overcoming, or at least alleviating, the above-mentioned drawback. It would be desirable to provide an antenna arrangement with reduced space requirements. It would be desirable to provide a user equipment with reduced internal space requirements. To better address these concerns, an antenna arrangement having the features disclosed herein is provided. Also, a user equipment having the features disclosed herein is provided.

According to a first aspect there is provided an antenna arrangement for a user equipment, the antenna arrangement comprising: a first antenna element configured to operate at frequencies above a limit frequency, a second antenna element configured to operate at frequencies below the limit frequency, and a wave trap configured to resonate within a frequency band above the limit frequency. The wave trap is connected to the second antenna element.

Since the wave trap is connected to the second antenna element, the wave trap is provided in conjunction with an already present constructional element of the antenna arrangement, and does not require any additional structure for providing the wave trap in the antenna arrangement. Thus, the antenna arrangement may take up less space than an antenna arrangement requiring an additional structure for providing the wave trap. As a result, the above-mentioned object is achieved. Moreover, the provision of the wave trap as such, improves isolation between the first antenna element and the second antenna element. Thus, the performance of the first antenna element is stabilized.

According to a second aspect, there is provided a user equipment comprising a housing, and a first transceiver circuitry and a second transceiver circuitry arranged inside the housing. The first transceiver circuitry is configured to handle a first frequency band above a limit frequency and the second transceiver circuitry is configured to handle a second frequency band below the limit frequency. The user equipment comprises an antenna arrangement according to any one of the first aspect and embodiments discussed herein.

Again, since the wave trap is connected to the second antenna element, the wave trap is provided in conjunction with an already present constructional element of the antenna arrangement. Thus, the user equipment does not require any additional structure for providing the wave trap in the user equipment. As a result, the above-mentioned object is achieved. Again, the provision of the wave trap as such, improves isolation between the first antenna element and the second antenna element. Thus, the performance of the first antenna element in the user equipment is improved.

The wave trap being connected to the second antenna element entails that the wave trap is physically connected to the second antenna element, and may only be indirectly connected to other elements of the antenna arrangement or the user equipment, via the second antenna element. The wave trap creates a high-impedance interface between the first and second antenna element and thus, electromagnetic energy from the first antenna element is not transferred to the second antenna element. The first antenna element may be a middle-high band frequency antenna element. The second antenna element may be a low band frequency antenna element.

The user equipment may be a portable user equipment, such as a mobile telephone, a laptop computer, a tablet computer, or a wearable device such as a smart watch. The user equipment may be configured for radio communication at one, two or more different frequencies.

According to embodiments of the first aspect, the wave trap may be galvanically connected to the second antenna element. In this manner, the wave trap may either be formed in one piece with the second antenna element, or the wave trap may be joined to the second antenna element with a galvanic material. Due to the galvanic connection between the wave trap and the second antenna element, the wave trap forms a resonating structure, and the function of the wave trap is achieved.

According to embodiments of the first aspect, the wave trap may be connected to the second antenna element via a capacitive coupling and/or inductive coupling. In this manner, the wave trap may be galvanically isolated from the second antenna element. However, due to the wave trap being connected to the second antenna element via a capacitive coupling and/or inductive coupling, the wave trap forms a resonating structure, and the function of the wave trap is achieved.

According to embodiments of the first aspect, an open end of the first antenna element may be directed towards an open end of the second antenna element. In this manner, a particular arrangement of the first antenna element and the second antenna element in the antenna arrangement may be achieved. Namely, conditions are provided for arranging the first antenna element substantially in line with the second antenna element in the antenna arrangement.

According to embodiments of the first aspect, the open end of the first antenna element may be arranged adjacent to the open end of the second antenna element. In this manner, space may be saved in the antenna arrangement since the first and second antenna elements thus, are arranged close together.

According to embodiments of the first aspect, an open end of the wave trap may be directed towards the open end of the first antenna element. In this manner, the wave trap, connected to the second antenna element, may improve isolation between the first antenna element and the second antenna element in a particularly advantageous manner.

According to embodiments of the first aspect, the limit frequency may be a frequency within a range of 800 MHz-1.2 GHz. In this manner, the antenna arrangement may be adapted for transmitting and/or receiving signals in a cellular network.

According to embodiments of the first aspect, the antenna arrangement may comprise a ground plane. The first and second antenna elements may be connected to the ground plane. In this manner, the first and second antenna elements may be formed e.g. by inverted-F antennas.

According to embodiments of the first aspect, the wave trap may comprise a stub. In this manner, the wave trap may be easily manufactured.

According to embodiments of the first aspect, the first antenna element may be configured to operate at least at a first wavelength, and wherein the stub has a length of a fraction of the first wavelength. In this manner, the wave trap creates a high-impedance interface at the first wavelength and thus, prevents electromagnetic energy to leak to the second antenna element. Accordingly, only a limited amount of power from the first antenna element is dissipated via the second antenna element.

According to embodiments of the first aspect, the first antenna element may be configured to operate at least at a first wavelength, and wherein the stub has a length of a quarter of the first wavelength, or of half the first wavelength. In this manner, the wave trap creates a high-impedance interface at the first wavelength and thus, prevents electromagnetic energy to leak to the second antenna element. Accordingly, only a limited amount of power from the first antenna element is dissipated via the second antenna element.

According to embodiments of the first aspect, the antenna arrangement may comprise a further wave trap. In this manner, isolation of the first antenna element from the second antenna element may be further improved. The further wave trap may be tuned to a different frequency than the wave trap.

Thus, isolation of the first antenna element from the second antenna element may be provided over a wider frequency range.

According to embodiments of the first aspect, the further wave trap may be connected to the second antenna element. In this manner, the further wave trap may be provided in a space efficient manner in the antenna arrangement.

According to embodiments of the first aspect, the antenna arrangement may comprise a third antenna element configured to operate at frequencies above the limit frequency. In this manner, the wave trap also may improve isolation of the third antenna element from the first and/or second antenna element.

According to embodiments of the second aspect, the housing of the user equipment may comprise a conductive peripheral structure. The first and second antenna elements, may form part of the conductive peripheral structure. In this manner, the antenna arrangement, and in particular the first and second antenna elements, may be provided at a periphery of the user equipment. Thus, the first and second antenna elements may be favorably positioned within the user equipment.

According to embodiments of the second aspect, the user equipment may comprise a third antenna element configured to operate at frequencies above the limit frequency. The third antenna element may form part of the conductive peripheral structure. In this manner, also the third antenna element may be provided in a favorable position at the periphery of the user equipment.

Further features and advantages will become apparent when studying the following detailed description.

BRIEF DESCRIPTION OF THE DRAWINGS

Various aspects and/or embodiments including particular features and advantages, will be readily understood from the example embodiments discussed in the following detailed description and the accompanying drawings, in which.

DETAILED DESCRIPTION

Aspects and/or embodiments will now be described more fully. Like numbers refer to like elements throughout. Well-known functions or constructions will not necessarily be described in detail for brevity and/or clarity.

Figure 1:
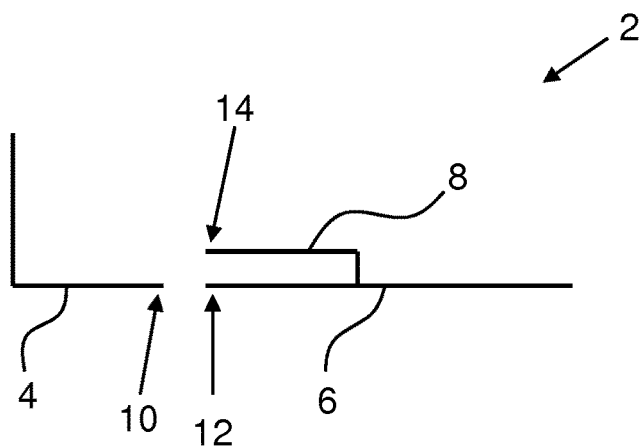
FIGS. 1-5b schematically illustrate antenna arrangements according to embodiments.

FIG. 1 schematically illustrates an antenna arrangement 2 according to embodiments. The antenna arrangement 2 is configured for use with a user equipment. The antenna arrangement 2 comprises a first antenna element 4 configured to operate at frequencies above a limit frequency and a second antenna element 6 configured to operate at frequencies below the limit frequency.

The antenna arrangement 2 further comprises a wave trap 8. The wave trap 8 is connected to the second antenna element 6. The wave trap 8 is configured to resonate within a frequency band above the limit frequency.

The limit frequency is a frequency within a range of 800 MHz-1.2 GHz. For instance the limit frequency may be 1 GHz. The first antenna element 4 may be a Middle-High Band frequency (MHB) antenna element for use in a frequency range of 1-6 GHz. The second antenna element 6 may be a low band frequency (LB) antenna element for use below 1 GHz, such as in a frequency range of 400 MHz-1 GHz. Thus, the antenna arrangement 2 is adapted for transmitting and/or receiving signals in a cellular network.

The first antenna element 4 may be tuned to operate at different frequencies within the MHB range. Similarly, the second antenna element 6 may be tuned to operate at different frequencies within the LB range. Such tuning of the first and/or second antenna elements may be achieved by RF switches and/or impedance tuners (not shown) known in the art.

In alternative embodiments, the first and second antenna elements 4, 6 may be configured for operating within other frequency ranges. Accordingly, the limit frequency may be different. Mentioned as an example, the limit frequency may be a frequency within a range of 2.7-3 GHz. Accordingly, the first antenna element 4 is configured for use within a frequency range above such a limit frequency, and the second antenna element 6 is configured for use within a frequency range below such a limit frequency.

The wave trap 8 is a resonance structure, such as parasitic arm, which accordingly, is configured to resonate above the operating frequency range of the second antenna element 6. In these embodiments, the wave trap 8 points toward the first antenna element 4. Alternatively, the wave trap 8 may point in an opposite direction, i.e. away from the first antenna element 4. Mentioned as examples, the wave trap 8 may be e.g. quarter-wavelength stub or a half-wavelength loop resonator. Specifically, the wave trap 8 does not introduce any resonance frequency below the limit frequency to the second antenna element 6.

The wave trap 8 provides a good isolation between the first antenna element 4 and the second antenna element 6.

The first antenna element 4 comprises an open end 10. The second antenna element 6 also comprises an open end 12. The open end 10 of the first antenna element 4 is directed towards the open end 12 of the second antenna element 6. Thus, conditions are provided for arranging the first antenna element 4 substantially in line with the second antenna element 6 in the antenna arrangement 2. In this manner, the first and second antenna elements 4, 6 are configured for being arranged along a periphery of a user equipment.

The open end 10 of the first antenna element 4 is arranged adjacent to the open end 12 of the second antenna element 6. In this manner, the first and second antenna elements 4, 6 are arranged close together, which provides for a compact antenna arrangement 2. However, closely arranged antenna elements may influence each other negatively. Due to the provision of the wave trap 8 connected to the second antenna element 6, the first and second antenna elements 4, 6 may be isolated from each other to a much larger extent than if the wave trap 8 were not provided.

The wave trap 8 comprises an open end 14. The open end 14 of the wave trap 8 is directed towards the open end 10 of the first antenna element 4. In this manner, the wave trap 8 provides good isolation between the first antenna element 4 and the second antenna element 6. The open end 14 of the wave trap 8 may be arranged in line with the open end 12 of the second antenna element 6, as shown in FIG. 1. Alternatively, e.g. due to space restrictions, the wave trap 8 may be arranged with its open end 14 not in line with the open end 12 of the second antenna element 6.

The wave trap 8 may comprise a stub.

The first antenna element 4 is configured to operate at least at a first wavelength. Suitably, the stub has a length of a fraction of the first wavelength. For instance, the stub may have a length of a quarter of the first wavelength, or of half the first wavelength. Frequency, f, and wavelength, are directly related to each other, according to the formula v/f, wherein v corresponds to the phase speed. In the present case, related to electromagnetic radiation, v equals the speed of light, i.e. approximately $3 \times 10^8$ m/s. Accordingly, the wave trap 8 may resonate within a frequency band about a first frequency corresponding to the first wavelength. The second antenna element 6 is configured to operate at wavelengths corresponding to frequencies below the limit frequency, and i.e. operates with longer wavelengths than the wave trap 8 and the first antenna element 4, and thus, at lower frequencies than the wave trap 8 and the first antenna element 4. In this manner, the wave trap creates a high-impedance interface at the first wavelength and thus, prevents electromagnetic energy to leak to the second antenna element. Accordingly, only a limited amount of power from the first antenna element is dissipated via the second antenna element.

Figure 2:
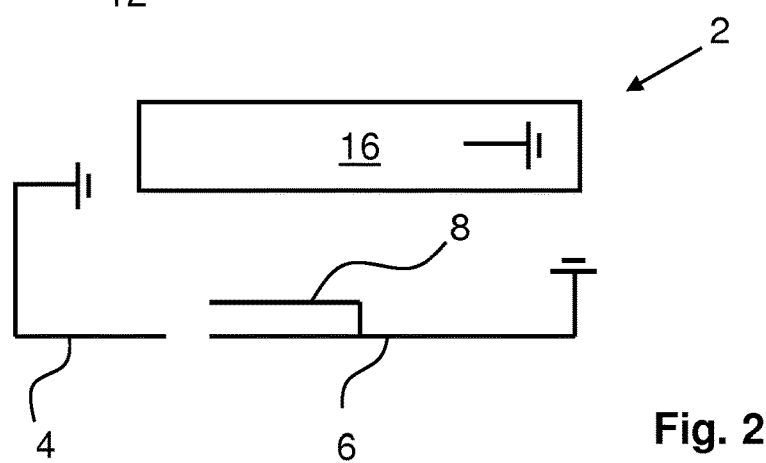

FIG. 2 schematically illustrates an antenna arrangement 2 according to embodiments. The antenna arrangement 2 resembles in much the antenna arrangement 2 of the embodiments of FIG. 1. Accordingly, in the following mainly the differing features will be discussed.

Again, the antenna arrangement 2 comprises first and second antenna elements 4, 6 and a wave trap 8 connected to the second antenna element 6.

The antenna arrangement 2 comprises a ground plane 16. The first and second antenna elements 4, 6 are connected to the ground plane 16. In FIG. 2, the connection of the first and second antenna elements 4, 6 to the ground plane 16 is schematically illustrated with ground symbols at the first and second antenna elements 4, 6.

Since the first and second antenna elements 4, 6 are connected to the ground plane 16, each of the first and second antenna elements 4, 6 may be formed by an inverted-F antenna (IFA).

Figure 3:
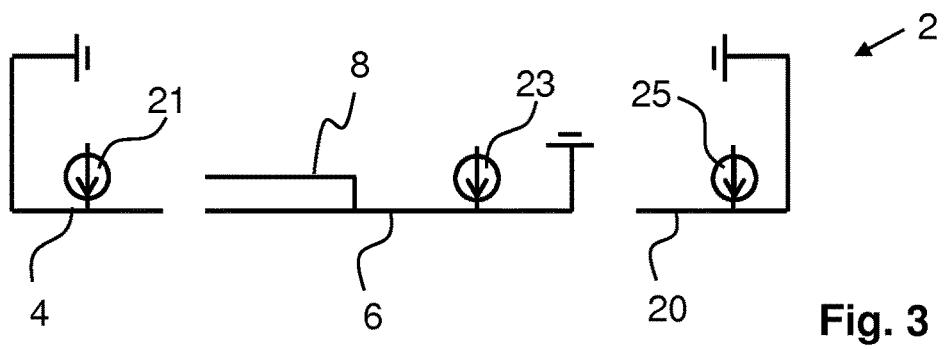

FIG. 3 schematically illustrates an antenna arrangement 2 according to embodiments. The antenna arrangement 2 resembles in much the antenna arrangement 2 of the embodiments of FIGS. 1 and 2. Accordingly, in the following mainly the differing features will be discussed.

Again, the antenna arrangement 2 comprises first and second antenna elements 4, 6 and a wave trap 8 connected to the second antenna element 6.

The antenna arrangement 2 comprises a third antenna element 20 configured to operate at frequencies above the limit frequency. These embodiments may form an antenna arrangement 2 for a three-antenna Multiple Input Multiple Output (MIMO) system. The second antenna element 6 is configured as an LB antenna element, and the first and third antenna elements form MHB antenna elements for MIMO operation.

Since the wave trap 8 is configured to resonate within a frequency band above the limit frequency, the wave trap 8 not only improves isolation of the first antenna element 4 from the second antenna element 6, but also isolation of the third antenna element 20 from the second antenna element 6. Also, the wave trap 8 may improve isolation of the first antenna element 4 from the third antenna element 20.

The third antenna element 20 is directed towards the second antenna element 6. The second antenna element 6 is arranged between the first and third antenna elements 4, 20. The third antenna element 20 is arranged in line with the second antenna element 6. The first, second, and third antenna elements 4, 6, 20 are arranged in line.

In FIG. 3 also first, second, and third signal sources 21, 23, 25 are shown. Each of the signal sources 21, 23, 25 is configured to feed one of the first, second, and third antenna elements 4, 6, 20 with a signal for transmission with the respective first, second, and third antenna element 4, 6, 20. The each of the first, second, and third signal source 21, 23, 25 may comprise a transceiver, or form part of a transceiver, of a user equipment. Each signal source 21, 23, 25 may comprise matching circuitry. A transceiver may comprise one or more RF switches and/or impedance tuners.

Figure 4:
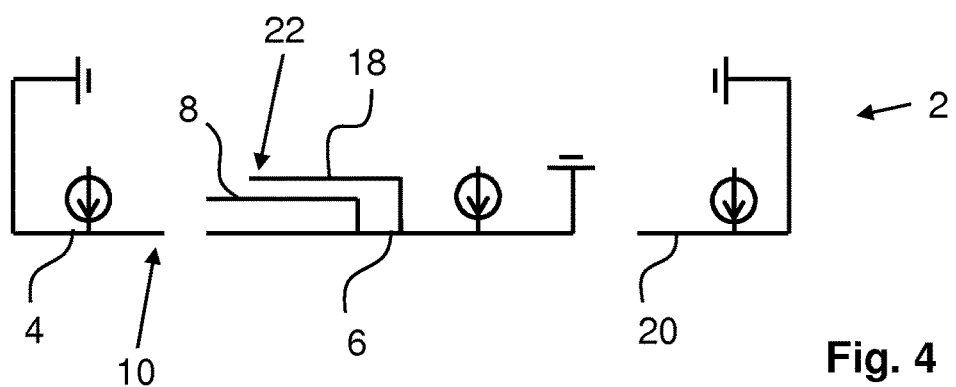

FIG. 4 schematically illustrates an antenna arrangement 2 according to embodiments. The antenna arrangement 2 resembles the antenna arrangement 2 of the embodiments of FIGS. 1-3. Accordingly, in the following mainly the differing features will be discussed.

Again, the antenna arrangement 2 comprises first and second antenna elements 4, 6 and a wave trap 8 connected to the second antenna element 6. Also, the antenna arrangement 2 comprises a third antenna element 20.

The antenna arrangement 2 comprises a further wave trap 18. The further wave trap 18 is configured to resonate within a frequency band above the limit frequency. Suitably, the further wave trap 18 is tuned to a different frequency than the wave trap 8. More specifically, the first antenna element 4 and/or the third antenna element 20 may be configured to operate at a second wavelength. Thus, the further wave trap 18 may be configured to resonate within a frequency band about a second frequency corresponding to the second wavelength. The second frequency of the further wave trap 18 may be close to the first frequency of the wave trap 8. Thus, together the wave trap 8 and the further wave trap 18 provide a collective extended operating frequency bandwidth of the wave traps, see further below with reference to FIG. 7.

For instance, the further wave trap 18 may comprise a stub having a length of a fraction of the second wavelength. For instance, the stub may have a length of a quarter of the second wavelength, or of half the second wavelength.

Thus, isolation of the first antenna element 4 and/or the second antenna element may be provided over a wider frequency range than if only one wave trap 8 is provided.

The further wave trap 18 is connected to the second antenna element 6. Thus, the further wave trap 18 may be provided in a space efficient manner in the antenna arrangement 2.

The further wave trap 18 is arranged at least partially along the wave trap 8. The further wave trap 18 comprises an open end 22. The open end 22 of the further wave trap 18 is directed towards the open end 10 of the first antenna element 4.

Figure 5A:
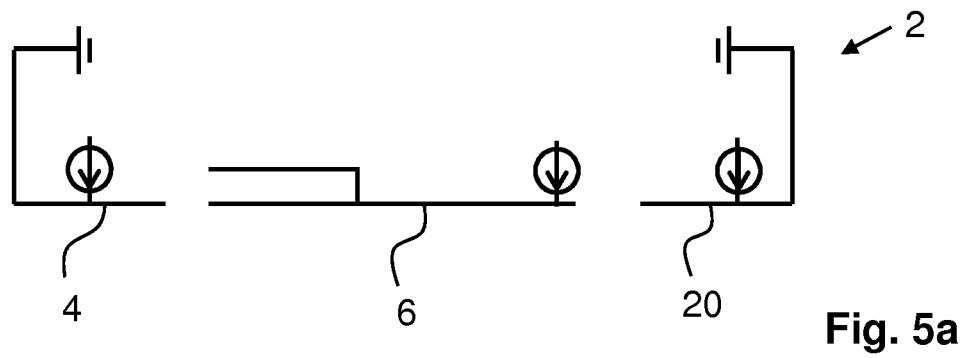
Figure 5B:
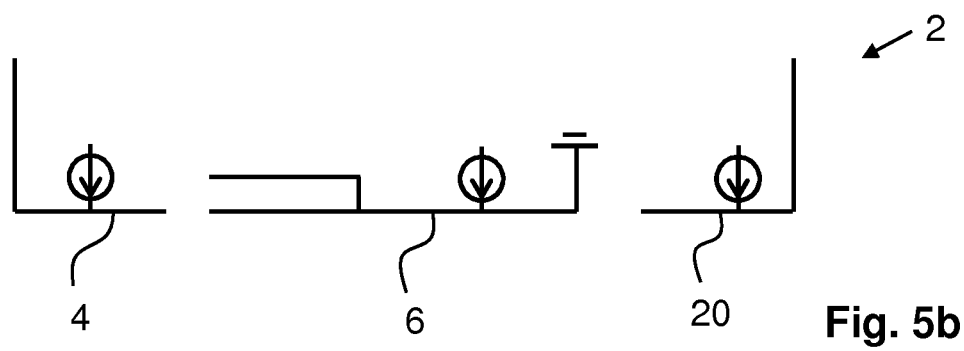

FIGS. 5a and 5b schematically illustrate antenna arrangements 2 according to embodiments. The antenna arrangements 2 resembles the antenna arrangement 2 of the embodiments of FIGS. 3 and 4. Accordingly, in the following mainly the differing features will be discussed.

In these embodiments different examples of grounded and non-grounded antenna elements 4, 6, 20 are shown. These examples may also be applied in antenna arrangements comprising only two antenna elements, as discussed above with reference to FIGS. 1 and 2.

In the embodiments of FIG. 5a the first and third antenna elements 4, 20 are grounded. The second antenna element 6 is not grounded. Thus, the first and third antenna elements 4, 20 may be e.g. IFA:s.

The second antenna element 6 may be a monopole antenna.

In the embodiments of FIG. 5b the first and third antenna elements 4, 20 are not grounded. The second antenna element 6 is grounded. Thus, the first and third antenna elements 4, 20 may be monopole antennas. The second antenna element 6 may be an IFA.

Figure 6:
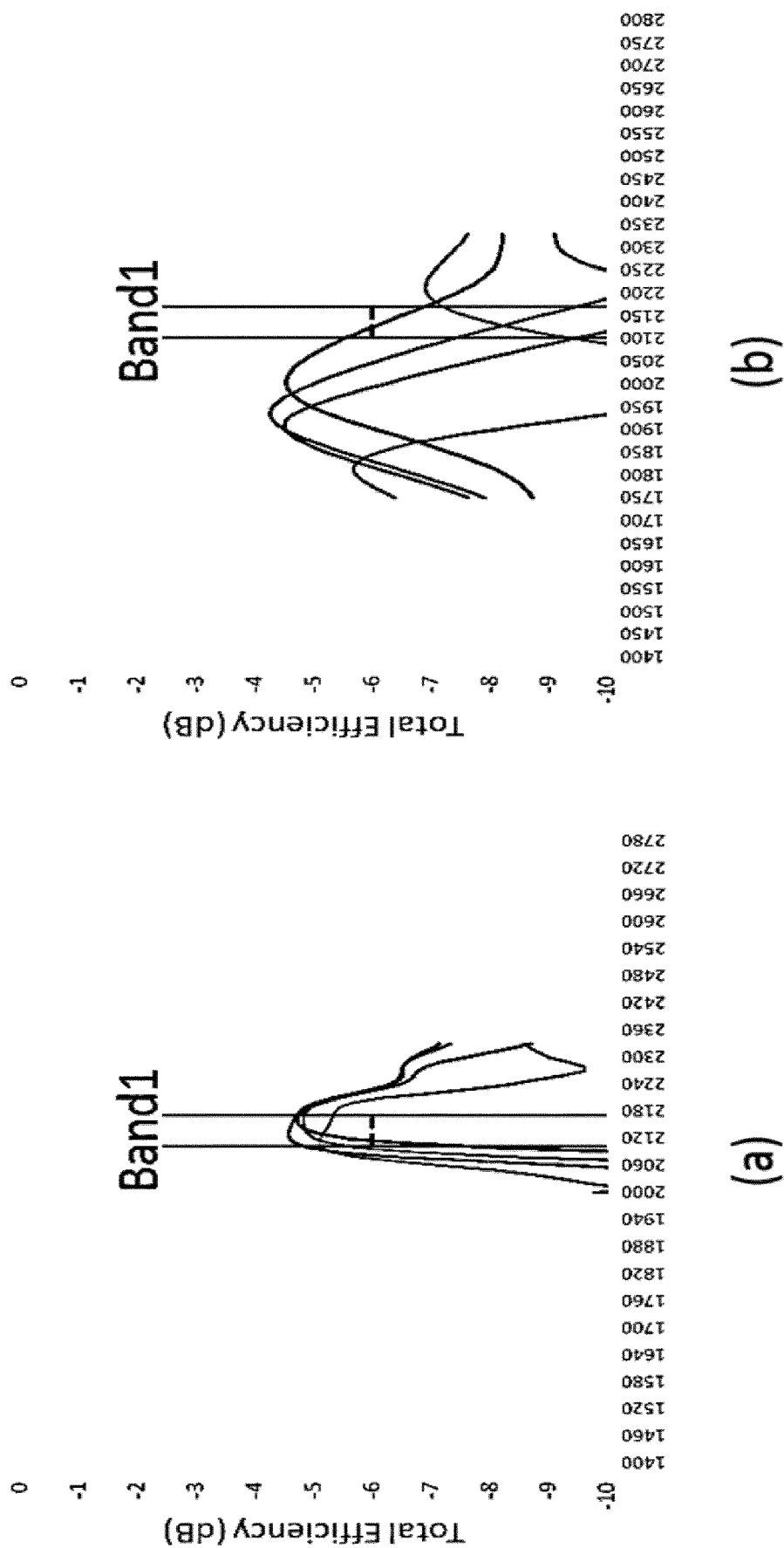
FIG. 6 shows two comparative diagrams of total efficiency of a first antenna element of an antenna arrangement.

FIG. 6 shows two comparative diagrams of the total efficiency of a first antenna element of an antenna arrangement with, and without, a wave trap. The antenna arrangement with a wave trap is an antenna arrangement 2 e.g. in accordance with the embodiments discussed above with reference to FIGS. 1-3, 5a and 5b, i.e. an antenna arrangement 2 comprising a first antenna element 4, and one wave trap 8 connected to the second antenna element 6.

In diagram (a), the total efficiency of the first antenna element 4 is shown. The different curves represent the efficiency of the first antenna element 4 (MHB) as the LB tuning state of the second antenna element 6 is varied, i.e. as the second antenna element 6 is tuned to different frequencies. In this example, the wave trap 8 is designed to operate at 2.1 GHz, i.e. the wave trap 8 resonates within a frequency band with a center frequency of 2.1 GHz. Mentioned purely as an example, the bandwidth of the wave trap 8 may be 500 MHz. As a result, the first antenna element 4 is isolated from the second antenna element 6, and the performance of the first antenna element 4 in Band-1 is good and stable.

In diagram (b), the different curves represent the efficiency of the first antenna element 4 (MHB) as the LB tuning state of the second antenna element 6 is varied without a wave trap 8 connected to the second antenna element 6. Isolation between the first and second antenna elements 4, 6 is poor, and the performance of the first antenna element 4 in Band-1 is not stable.

Mentioned as an example, the isolation between the first and second antenna elements 4, 6 may be improved by 24 dB with the wave trap 8 connected to the second antenna element 6, compared to if no wave trap 8 is provided.

Figure 7:
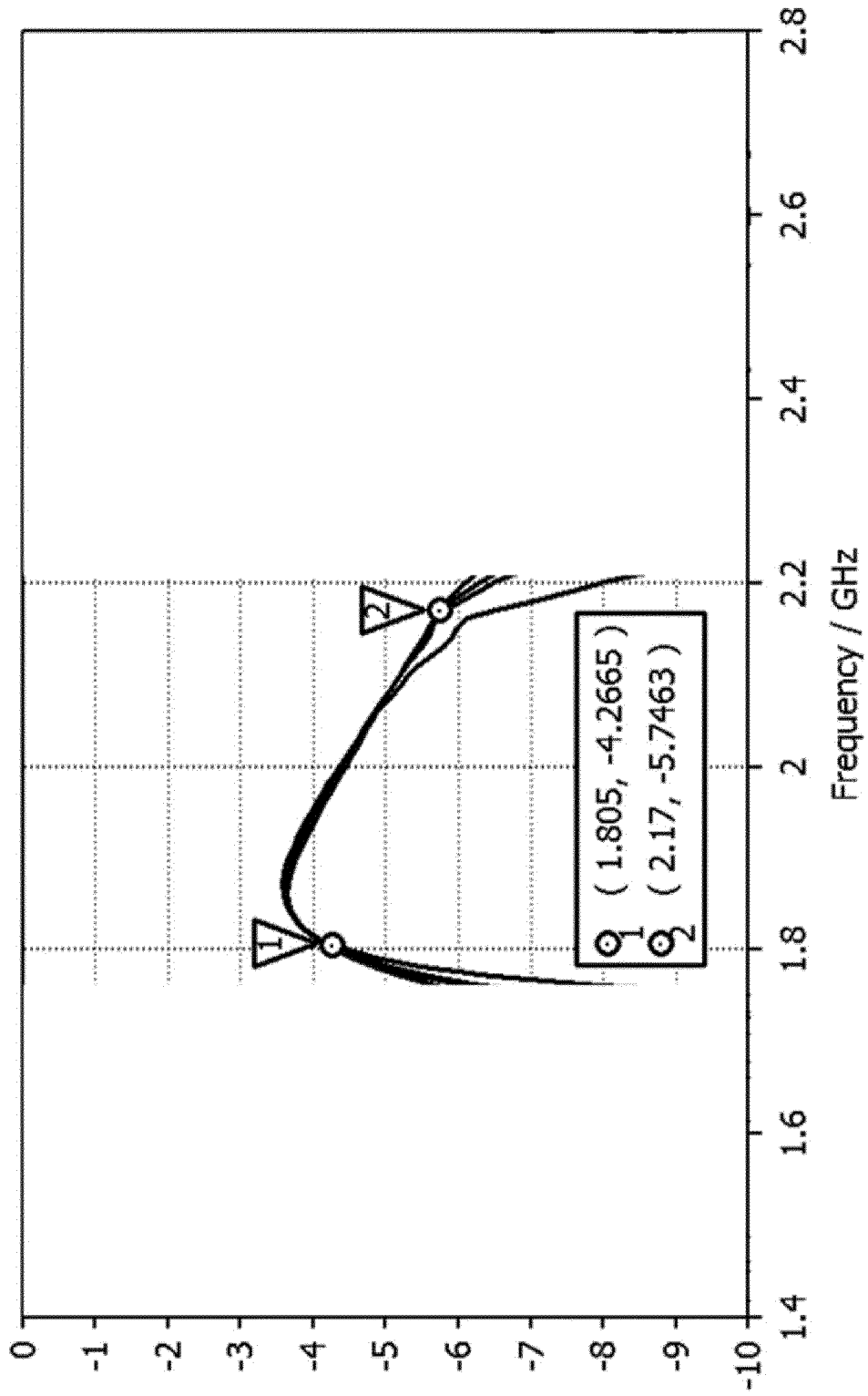
FIG. 7 shows the total efficiency of a first antenna element of an antenna arrangement with two wave traps, FIG. 8 schematically illustrates a user equipment according to embodiments, FIG. 9 schematically illustrates a conductive peripheral structure a housing of a user equipment, and FIG. 10 schematically illustrates a portion of a conductive peripheral structure of a housing of a user equipment.

FIG. 7 shows the total efficiency of a first antenna element of an antenna arrangement with a wave trap and a further wave trap. The antenna arrangement is an antenna arrangement 2 e.g. in accordance with the embodiments discussed above with reference to FIG. 4, i.e. an antenna arrangement 2 comprising a first antenna element 4, and two wave traps 8, 18 connected to the second antenna element 6.

Again, in the diagram, the different curves represent the efficiency of the first antenna element 4 (MHB) as the LB tuning state of the second antenna element 6 is varied, i.e. as the second antenna element 6 is tuned to different frequencies. In this example, the wave trap 8 is designed to operate at 1.8 GHz (the point marked with number 1 in the diagram) and the further wave trap 18 is designed to operate at 2.17 GHz (the point marked with number 2 in the diagram). That is, the wave trap 8 resonates within a frequency band with a center frequency of 1.8 GHz, and the further wave trap 18 resonates within a frequency band with a center frequency of 2.17 GHz. As a result, the first antenna element 4 is isolated from the second antenna element 6, and the performance of the first antenna element 4 is good and stable.

The effect of the two wave traps 8, 18 can be seen in the diagram. The total efficiency of the first antenna element 4 is stable within a wide frequency range, in the embodiments within a frequency range of 1.8-2.2 GHz. This may be compared with the frequency range of the embodiments of FIG. 6 (a), wherein the first antenna element 4 is stable in a narrower frequency range, approximately a range of 150 MHz 2.1-2.24 GHz)

Mentioned as an example, the isolation between the first and second antenna elements 4, 6 may be improved from 7 dB to 30 dB at 1.8 GHz by the provision of the wave trap 8 and the further wave trap 18 connected to the second antenna element 6.

Figure 8:
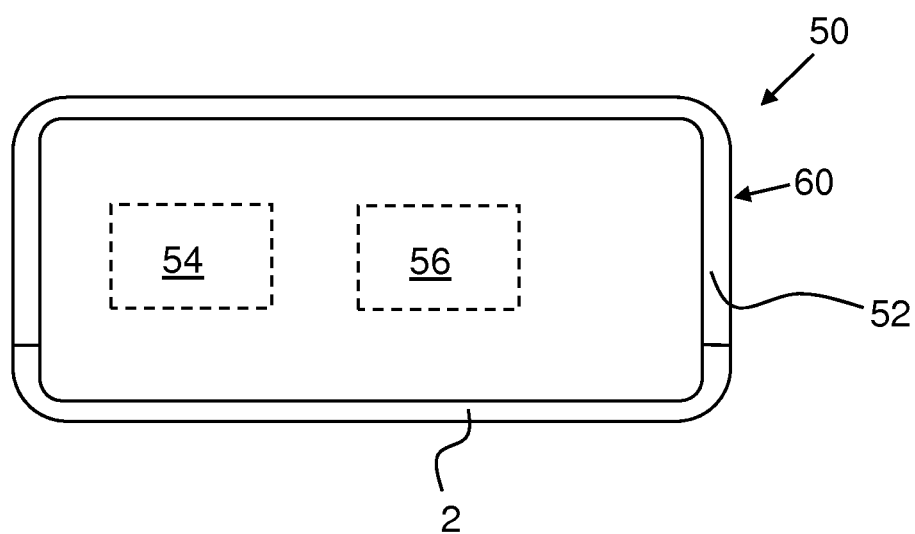

FIG. 8 schematically illustrates a user equipment 50 according to embodiments. The user equipment 50 may be a portable user equipment, such as a mobile telephone, a laptop computer, a tablet computer, or a wearable device such as a smart watch. In these embodiments, the user equipment 50 is exemplified in the form of a mobile telephone. User equipment is configured for radio communication at one, two or more different frequencies.

The radio communication may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Spécial Mobile) (GSM)/Enhanced Data rate for GSM Evolution (GSM/EDGE), Wideband Code Division Multiple Access (WCD-MA), Time Division Multiple Access (TDMA) networks, Frequency Division Multiple Ac-cess (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options.

The user equipment 50 comprises a housing 52, and a first transceiver circuitry 54 and a second transceiver circuitry 56 arranged inside the housing 52. The first transceiver circuitry 54 is configured to handle a first frequency band above a limit frequency and the second transceiver circuitry 56 is configured to handle a second frequency band below the limit frequency. The first, second, and third signal sources 21, 23, 25 discussed above with reference to FIG. 3 may form part of the first and or second transceiver circuit 54, 56. Thus, in the first and second transceiver circuits 54, 56 there may be provided matching circuitry, and/or RF switches and/or impedance tuners.

The user equipment 50 comprises an antenna arrangement 2 according to any one of aspects and/or embodiments discussed herein. Accordingly, the antenna arrangement 2 comprises at least a first antenna element, a second antenna element, and a wave trap connected to the second antenna element. See also FIGS. 9 and 10.

In the shown embodiments, at least part of the antenna arrangement 2 forms part of a peripheral structure 60 of the housing 52 of the user equipment 50. See also FIGS. 9 and 10.

Figure 9:
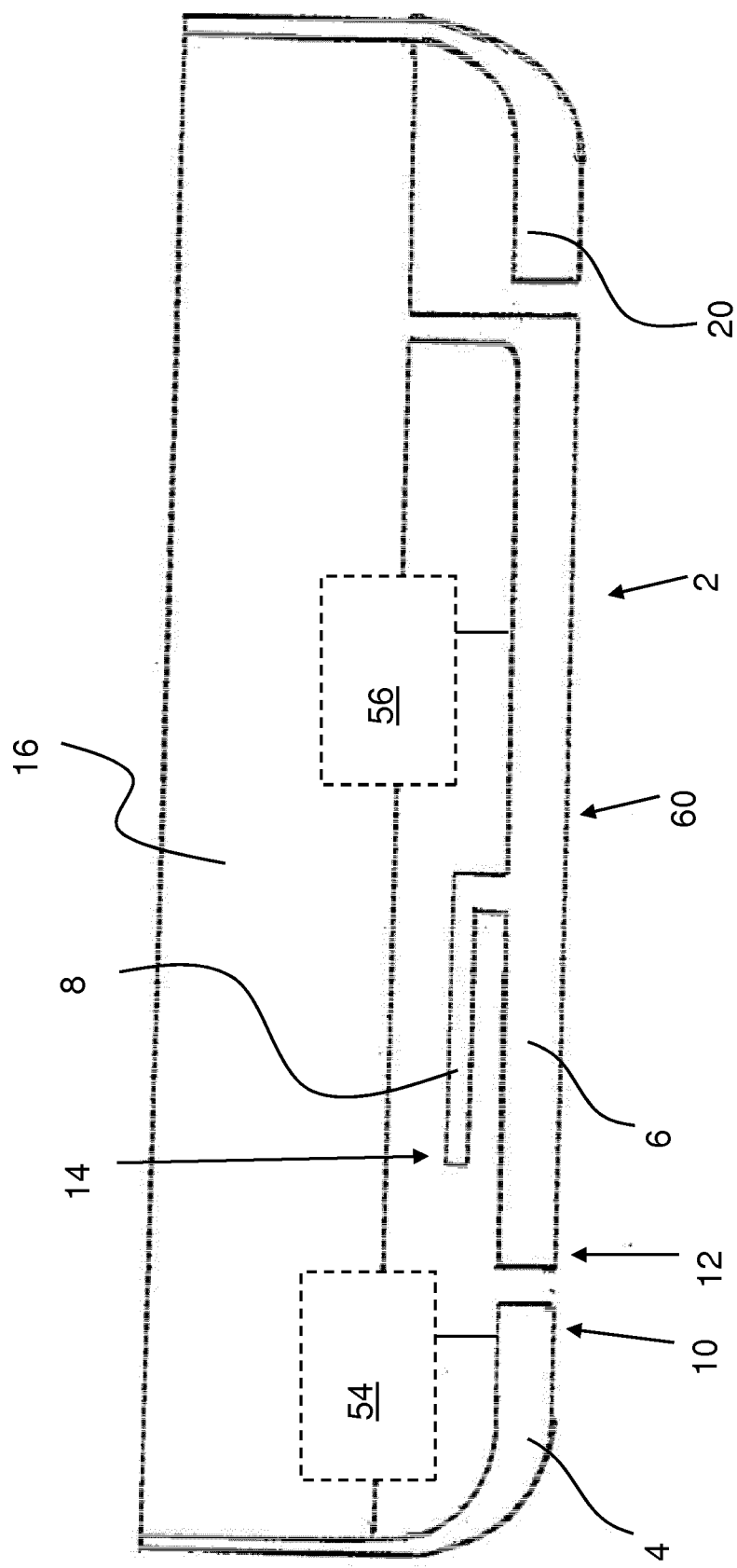

FIG. 9 schematically illustrates a conductive peripheral structure 60 of a housing of a user equipment. The user equipment may be a user equipment 50 as discussed in connection with FIG. 8 above.

The conductive peripheral structure 60 is electromagnetically conductive, i.e. suited to form at least one antenna of the user equipment. The peripheral structure 60 comprises an antenna arrangement 2 of the user equipment. The antenna arrangement 2 is an antenna arrangement 2 in accordance with any one of the embodiments discussed above with reference to FIGS. 1-7.

Accordingly, the antenna arrangement 2 comprises a first antenna element 4 configured to operate at frequencies above a limit frequency, and a second antenna element 6 configured to operate at frequencies below the limit frequency. The antenna arrangement 2 comprises a wave trap 8 connected to the second antenna element 6. The wave trap 8 is configured to resonate within a frequency band above the limit frequency.

As the wave trap 8 is provided in conjunction with the second antenna element 6 of the antenna arrangement 2, no additional structure is required in the antenna arrangement 2 for providing the wave trap 8 in the antenna arrangement 2. Thus, a compact antenna arrangement 2 is provided.

The first antenna element 4 comprises an open end 10. The second antenna element 6 also comprises an open end 12. The open end 10 of the first antenna element 4 is directed towards the open end 12 of the second antenna element 6. The open end 10 of the first antenna element 4 is arranged adjacent to the open end 12 of the second antenna element 6.

The wave trap 8 comprises an open end 14. The open end 14 of the wave trap 8 is directed towards the open end 10 of the first antenna element 4.

A first transceiver circuitry 54 connected to the first antenna element 4 is indicated in FIG. 9. A second transceiver circuitry 56 connected to the second antenna element 6 is indicated in FIG. 9.

The first and second antenna elements 4, 6 form part of the conductive peripheral structure 60. The first and second antenna elements 4, 6 are arranged in line along the peripheral structure 60.

In these embodiments, the antenna arrangement 2 comprises a third antenna element 20. The third antenna element 20 forms part of the conductive peripheral structure 60. The third antenna element 20 is arranged in line with the second antenna element 6.

The conductive peripheral structure 60 comprises a ground plane 16. Each of the first, second, and third antenna elements 4, 6, 20 is connected to the ground plane 16.

Figure 10:
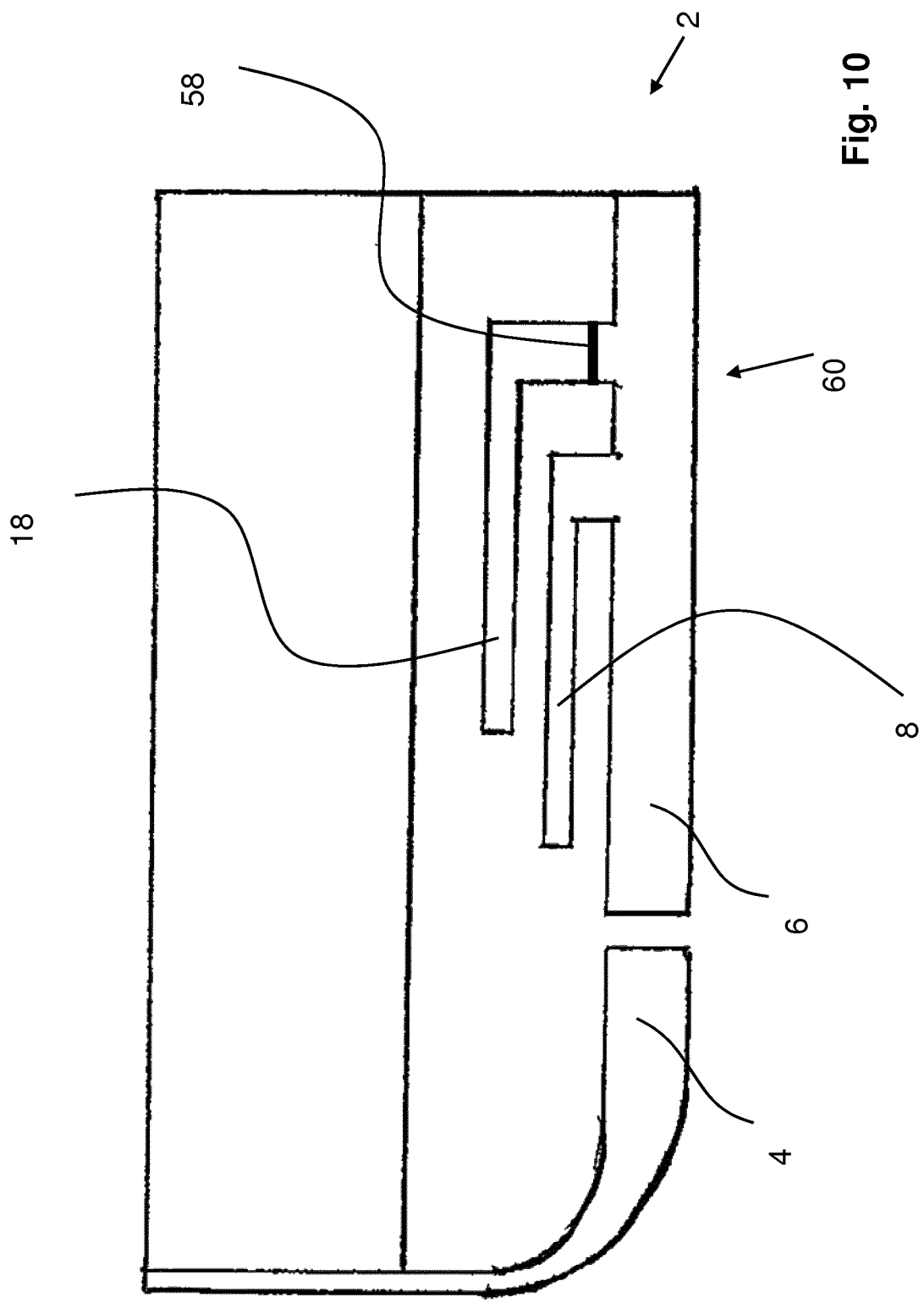

FIG. 10 schematically illustrates a portion of a conductive peripheral structure 60 of a housing of a user equipment according to alternative embodiments. The user equipment may be a user equipment 50 as discussed in connection with FIG. 8 above. The conductive portion 60 resembles in much the conductive portion 60 discussed above in connection with FIG. 9. Accordingly, mainly the differing features will be discussed in the following.

In these embodiments, two wave traps are connected to the second antenna element 6 of the antenna arrangement 2, namely, wave trap 8 and a further wave trap 18. The two wave traps 8, 18 are further discussed above with reference to FIG. 4 and may function as discussed above with reference to FIG. 7.

With reference to FIG. 10 the connection of the wave trap 8 and the further wave trap 18 with the second antenna element 6 will be discussed in the following.

The wave trap 8 and the further wave trap 18 are physically connected to the second antenna element 6.

According to some embodiments the wave trap 8 and/or the further wave trap 18 may be galvanically connected to the second antenna element 6. This may be achieved in two ways either, the wave trap 8 and/or the further wave trap 18 may be formed in one piece with the second antenna element 6, or the wave trap 8 and/or the further wave trap 18 may be joined to the second antenna element 6 with a galvanic material. The wave trap 8 and/or the further wave trap 18 may be provided on a flexible printed circuit (FPC). The FPC is joined with the second antenna element 6. In the latter case, the wave trap 8 and/or the further wave trap 18 may be e.g. soldered to the second antenna element 6, or attached to the second antenna element 6 by conductive glue. In FIG. 10, the galvanic connection between a wave trap and the second antenna element 6 is illustrated at the wave trap 8. The soldered/glued connection between the further wave trap 18 and the second antenna element 6 is illustrated with a line 58.

According to some embodiments, the wave trap 8 and/or the further wave trap 18 may be connected to the second antenna element 6 via a capacitive coupling and/or inductive coupling. However, a galvanically isolated wave trap 8 and/or further wave trap 18 may be capacitively or inductively coupled to the second antenna element 6. Thus, a non-galvanic connection between the wave trap 8 and/or the further wave trap 18 and the second antenna element 6 may be achieved. A non-galvanic connection between the wave trap 8 and/or the further wave trap 18 and the second antenna element 6 may be achieved e.g. with a non-conductive glue. In FIG. 10, also the non-galvanic connection between a wave trap and the second antenna element 6 is illustrated at the further wave trap 18 with the line 58.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. An antenna arrangement for a user equipment, the antenna arrangement comprising:
a first antenna element configured to operate at frequencies above a limit frequency,
a second antenna element configured to operate at frequencies below the limit frequency, and
a wave trap configured to resonate within a frequency band above the limit frequency, wherein
one end of the wave trap is connected to the second antenna element, and the other end of the wave trap is an open end.

2. The antenna arrangement according to claim 1, wherein the wave trap is galvanically connected to the second antenna element.

3. The antenna arrangement according to claim 1, wherein the wave trap is connected to the second antenna element via a capacitive coupling and/or inductive coupling.

4. The antenna arrangement according to any one of the preceding claim 1, wherein an open end of the first antenna element is directed towards an open end of the second antenna element.

5. The antenna arrangement according to claim 4, wherein the open end of the first antenna is arranged adjacent to the open end of the second antenna element.

6. The antenna arrangement according to claim 4, wherein the open end of the wave trap is directed towards the open end of the first antenna element.

7. The antenna arrangement according to claim 1, wherein the limit frequency is a frequency within a range of 800 MHz 1.2 GHz.

8. The antenna arrangement according to claim 1, further comprising a ground plane, wherein the first and second antenna elements are connected to the ground plane.

9. The antenna arrangement according to claim 1, wherein the wave trap comprises a stub.

10. The antenna arrangement according to claim 9, wherein the first antenna element is configured to operate at least at a first wavelength, and wherein the stub has a length of a fraction of the first wavelength.

11. The antenna arrangement according to claim 9, wherein the first antenna element is configured to operate at least at a first wavelength, and wherein the stub has a length of a quarter of the first wavelength, or of half the first wavelength.

12. The antenna arrangement according to claim 1, further comprising a second wave trap.

13. The antenna arrangement according to claim 12, wherein the second wave trap is connected to the second antenna element.

14. The antenna arrangement according to claim 1, further comprising a third antenna element configured to operate at frequencies above the limit frequency.

15. The antenna arrangement according to claim 1, wherein the open end of the wave trap is directed towards an open end of the first antenna element;
the open end of the wave trap is arranged in line with an open end of the second antenna element; and
the open end of the first antenna element faces the open end of the second antenna element.

16. The antenna arrangement according to claim 1, wherein
a length of the wave trap extends in a direction from the open end of the wave trap; and
a length of the second antenna element extends in the direction from an open end of the second antenna such that the length of the second antenna extends in parallel with the length of the wave trap.

17. The antenna arrangement according to claim 1, wherein each of the first and second antenna elements is formed by an inverted-F antenna.

18. A user equipment comprising a housing, and a first transceiver circuitry and a second transceiver circuitry arranged inside the housing, wherein
the first transceiver circuitry is configured to handle a first frequency band above a limit frequency and the second transceiver circuitry is configured to handle a second frequency band below the limit frequency, and wherein
the user equipment comprises an antenna arrangement wherein
the antenna arrangement comprises:
a first antenna element configured to operate at frequencies above the limit frequency,
a second antenna element configured to operate at frequencies below the limit frequency, and
a wave trap configured to resonate within a frequency band above the limit frequency,
wherein one end of the wave trap is connected to the second antenna element, and the other end of the wave trap is an open end.

19. The user equipment according to claim 18, wherein the housing comprises a conductive peripheral structure, and wherein the first and second antenna elements form part of the conductive peripheral structure.

20. The user equipment according to claim 19, further comprising a third antenna element configured to operate at frequencies above the limit frequency, wherein the third antenna element forms part of the conductive peripheral structure.

* * * * *

UNITED STATES PATENT AND TRADEMARK OFFICE
CERTIFICATE OF CORRECTION

| | |
|---|---|
| PATENT NO. | : 11,228,094 B2 |
| APPLICATION NO. | : 16/979267 |
| DATED | : January 18, 2022 |
| INVENTOR(S) | : Ilvonen et al. |

It is certified that error appears in the above-identified patent and that said Letters Patent is hereby corrected as shown below:

In the Specification

Column 6, Lines 13-14, should read:
Frequency, f, and wavelength, λ, are directly related to each other, according to the formula λ=v/f, Column 9, Lines 7-8, should read:
narrower frequency range, approximately a range of 150 MHz (≈ 2.1 - 2.24 GHz)

In the Claims

Claim 4, Column 11, Lines 58-59, should read:
The antenna arrangement according to claim 1, wherein an open end of the first antenna…

Signed and Sealed this
Thirtieth Day of August, 2022

Katherine Kelly Vidal
*Director of the United States Patent and Trademark Office*